UNITED STATES PATENT OFFICE.

GEORGE BARRETT McMULLEN, OF CHICAGO, ILLINOIS, ASSIGNOR, BY MESNE ASSIGNMENTS, TO ZALMON G. SIMMONS, OF KENOSHA, WISCONSIN, ANDREW W. PRESTON, OF SWAMPSCOTT, MASSACHUSETTS, AND BRADLEY W. PALMER, OF BOSTON, MASSACHUSETTS, TRUSTEES.

SUGAR-PRODUCING PRODUCT.

1,040,558.  Specification of Letters Patent.  Patented Oct. 8, 1912.

No Drawing.  Application filed June 7, 1909. Serial No. 500,498.

*To all whom it may concern:*

Be it known that I, GEORGE BARRETT MC-MULLEN, a citizen of the United States, residing at Chicago, in the county of Cook and State of Illinois, have invented certain new and useful Improvements in Sugar-Producing Products, of which the following is a specification.

This invention relates to improvements in sugar producing products, and refers more particularly to an improved sugar producing product derived from sugar-cane.

Among the salient objects of the present invention are to provide a product containing substantially the entire sugar content in the same uninverted crystallizable condition in which it existed in the cane when harvested; to provide a product which contains the sugar in such condition that it may be dissolved or diffused out almost instantly by water and its extraction accompanied by the extraction of a minimum amount of impurities or constituents of the product other than sugar; to provide a product which in its finished condition may be preserved under ordinary atmospheric exposures and conditions indefinitely without substantial deterioration; to provide a product which may be produced in its preservable form at a very low cost, by the use of extremely simple and inexpensive apparatus and with the aid of help of only moderate skill; to provide a product which, after being deprived of sugar, leaves a by-product which is in ideal condition for paper making or conversion into other cellulose products; to provide a product which yields up its entire sugar content by an extremely simple and rapid dissolving and diffusion process, thus insuring a maximum yield of sugar while at the same time the extracted liquor or syrup is in a purer state than has heretofore been secured; and in general, to provide an improved product of the character referred to.

Describing this new product more particularly, and the manner in which I produce the same, I have discovered that sugar-cane in its matured, undried condition, stripped and harvested as is usual, may be disintegrated and separated into its chief structural parts, viz: the pith portion separated from the shell and other woody portions, by an extremely simple and rapid process, and that these two separated portions each possess individual and novel characteristics as products.

In practising this invention, I first shred the sugar-cane into finely divided condition, in which condition the shell and fibro-vascular portions are in the form of fine filaments and the pith in the form of small particles somewhat resembling wet sawdust. This shredding operation I have carried on with great success by the use of a machine essentially like that shown and described in Patent No. 813,300 granted to J. W. Hyatt February 20, 1906, but there may be other suitable mechanism for performing such shredding. The novel product of the present invention is this fibrous portion of the sugar-cane separated, or concentrated with reference to the pithy portions. The degree of separation or concentration of the respective fractions is such as may be attained by screening under the described conditions, and should be adequate to secure the advantages herein pointed out. To effect the separation of the mass, after it has been thus shredded, I resort to a screening or sifting operation, and to this end I prefer to use ordinary wire screens of suitable mesh; preferably using a series or gang of screens of successively finer mesh, through which the product is sifted. These screens are agitated or shaken in a well-understood manner, and are ordinarily inclined so that the filamentary fiber passes over the screens and is discharged at one end thereof while the pith material passes through. Where the operation is performed manually, the material may be placed upon the screens and the pith particles sifted out in batches much in the manner that the housewife dredges flour. Commercially, however, I employ a machine so organized that the mixture of shredded material is fed to a series of superposed inclined screens of graded and decreasing size from the uppermost downwardly, and these screens being agitated, the pith passes successively through the several screens, and the filamentary shreds pass over and discharge at one end of the machine. The two products are then separately collected. The operation of screening may be performed by such a machine very rapidly and at insignificant expense. The pithy and fibrous products thus separated out possess their original proportions of the natural sugar juices, and, owing to the uniformity of disintegration, may be passed through a suitable drier and be manipulated in such manner while thus passing through the drier as to give up their moisture very rapidly and at an extremely moderate temperature. Inasmuch as the crystallizable sugar is the most valuable constituent of these products it is important that the drying be so conducted that the full sugar content be preserved uninverted. To this end the drying is preferably conducted at a temperature in the material being dried ranging from 100° to 212° Fahrenheit, and conducted under such conditions that the moisture-laden vapor is withdrawn from the drying material practically as fast as formed. In a pending application filed by George W. McMullen, Serial No. 425,614, filed April 7, 1908, there is set forth and described an apparatus which is suitable for efficiently and economically drying the products, although other types of apparatus may be used. The material should be dried to a condition of chemical stability, containing less than thirty per cent. of moisture, and preferably to atmospheric dryness containing say six to twelve per cent. of moisture.

The filamentary or woody fibrous material which is thus separated out forms the subject matter of the present invention, and it is characteristically new, among others, in the following respects: As a result of separating this fibrous material from the pith particles, it is left in a much more open spongy or permeable condition, and under the described operating conditions the operation of drying is shortened as compared with drying the mixture without separation. Dried under properly controlled conditions, as hereinbefore described, it contains substantially the entire natural sugar content uninverted, i. e. in crystallizable form, and because of its finely shredded condition and permeability, and because of the effect of the drying it yields its sugar to the dissolving fluid (usually water) almost instantly while at the same time it gives up but comparatively small percentages of the other less soluble constituents which for sugar making purposes are regarded as impurities. This product contains a smaller percentage of sugar than the pith product separated therefrom, and for this reason among others the extraction of the sugar by solution or diffusion can be more advantageously carried out than where the two products are treated in mixed condition. In other words, it is an advantage to treat the relatively rich and relatively lean products separately.

The residual product is composed largely of cellulose in the form of long filamentary fibers, and is in ideal condition to permit the ultimate fiber to be separated from the intercellular structure by subsequent chemical treatment. It has been amply demonstrated that this filamentary fiber makes a paper which is extremely soft, strong and susceptible of being bleached as thoroughly as any known product, in fact paper made therefrom is of high commercial quality, and the fiber is so long and strong that it is valuable for use in mixing with inferior grades of pulp in the manner in which sulfite fiber is now used. Where lower grade fiber board or paper is desired, the product is in splendid condition for this use with or without previous mechanical treatment.

I claim as my invention:

1. As a new article of manufacture, the woody fibrous constituents of sugar-cane containing its natural sugar content and mechanically shredded into relatively fine filamentary form and separated or concentrated with reference to the pith portions of the plant.

2. As a new article of manufacture, the woody fibrous constituents of sugar-cane containing substantially its full natural sugar content in uninverted or crystallizable form and separated or concentrated with reference to the pith portions of the plant.

3. As a new article of manufacture, the woody fibrous constituents of sugar-cane, shredded and containing substantially its full natural sugar content, dried to a condition containing less than thirty per cent. of moisture and separated or concentrated with reference to the pith portions of the plant.

4. As a new article of manufacture, the woody fibrous constituents of sugar cane, comminuted and reduced to a mass consisting chiefly of fine excelsior-like filaments and particles, dried to permanently stable condition, impregnated with sugar in its natural uninverted state and practically uncontaminated by chemically inverted sugar, said woody fibrous constituents being very largely physically dissociated and separated from the pith constituents of the cane.

GEORGE BARRETT McMULLEN.

Witnesses:
FRANK L. BELKNAP,
ANNA O'BRIEN.